(12) United States Patent
Kim et al.

(10) Patent No.: US 11,433,950 B2
(45) Date of Patent: Sep. 6, 2022

(54) FRONT LOWER BODY STRUCTURE OF VEHICLE HAVING IMPROVED STIFFNESS

(71) Applicants: Hyundai Motor Company, Seoul (KR); Kia Motors Corporation, Seoul (KR)

(72) Inventors: Eon-Pyo Kim, Seoul (KR); Seung-Tae Song, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/158,708

(22) Filed: Jan. 26, 2021

(65) Prior Publication Data

US 2022/0119043 A1 Apr. 21, 2022

(30) Foreign Application Priority Data

Oct. 15, 2020 (KR) .................. 10-2020-0133421

(51) Int. Cl.
*B62D 27/02* (2006.01)
*B62D 25/20* (2006.01)

(52) U.S. Cl.
CPC ....... *B62D 27/023* (2013.01); *B62D 25/2018* (2013.01)

(58) Field of Classification Search
CPC ...... B62D 27/02; B62D 27/023; B62D 25/08; B62D 25/20; B62D 25/2009; B62D 25/2018
USPC ..... 296/204, 203.01, 203.02, 203.03, 29, 30
See application file for complete search history.

(56) References Cited

U.S. PATENT DOCUMENTS

2017/0080978 A1 * 3/2017 Yoshida .............. B62D 25/2018
2019/0092396 A1 * 3/2019 Abe ...................... B62D 25/20

FOREIGN PATENT DOCUMENTS

JP          2017-154515       *   9/2017
KR      20140024602  A        3/2014

* cited by examiner

*Primary Examiner* — Dennis H Pedder
(74) *Attorney, Agent, or Firm* — Slater Matsil, LLP

(57) ABSTRACT

A front lower body structure of a vehicle includes a front side rear lower member connected from a front side member disposed on one side of a fender apron to a side sill inner, a center floor side upper member disposed in a longitudinal direction of the vehicle and extending from an upper surface of a dash panel to a center floor panel, and a reinforcement bracket connecting the front side rear lower member with the center floor side upper member.

20 Claims, 13 Drawing Sheets

FRONT LOWER BODY STRUCTURE OF VEHICLE HAVING IMPROVED STIFFNESS

CROSS-REFERENCE TO RELATED APPLICATIONS

This application claims the benefit of Korean Patent Application No. 10-2020-0133421, filed on Oct. 15, 2020, which application is hereby incorporated herein by reference.

TECHNICAL FIELD

The present disclosure relates to a front lower body structure of a vehicle having improved stiffness.

BACKGROUND

Figure 1:
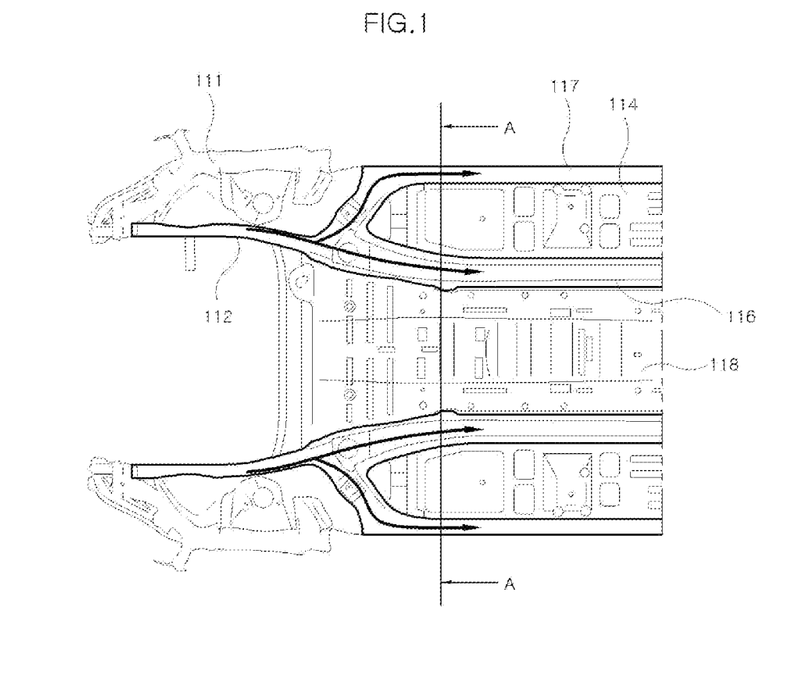
FIG. 1 is a bottom diagram illustrating a front lower body structure of a vehicle mounted with an internal combustion engine according to the related art.
Figure 2:
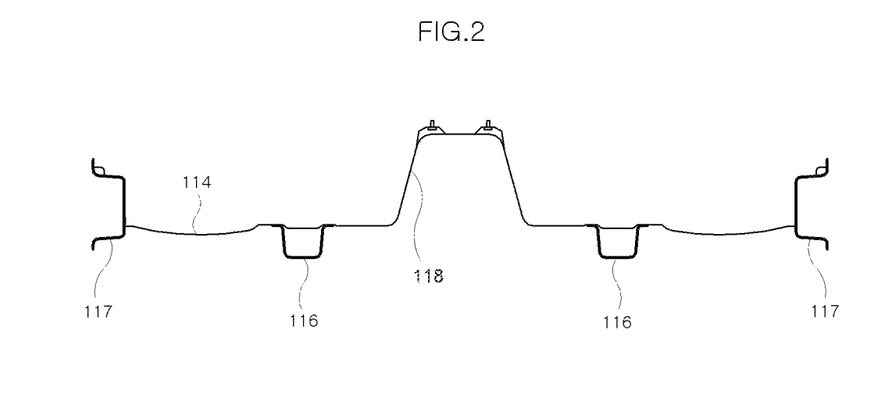
FIG. 2 is a cross-sectional diagram taken along the line A-A illustrated in FIG. 1.

As illustrated in FIGS. 1 and 2, a vehicle mounted with an internal combustion engine divides the load into a center floor side member 116 and a side sill inner 117 from a front side member 112 of a fender apron 111 toward a center floor panel 114 to transfer the load to the rear side thereof (see the arrow illustrated in FIG. 1). The load input to the front side member 112 is divided into the center floor side member 116 and the side sill inner 117 and transferred to the rear of the vehicle, thereby securing sufficient stiffness against collision. Further, the vehicle mounted with the internal combustion engine is formed with a center tunnel 118 such that the center floor panel 114 has an exhaust pipe or the like installed on the intermediate portion thereof thereby serving to also improve the stiffness.

Figure 3:
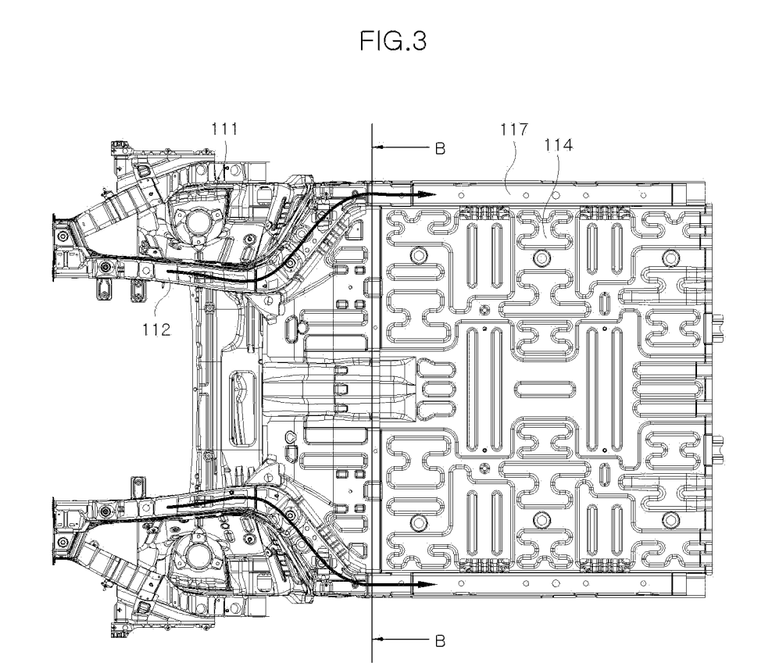
FIG. 3 is a bottom diagram illustrating a front lower body structure of an electric vehicle according to the related art.
Figure 4:
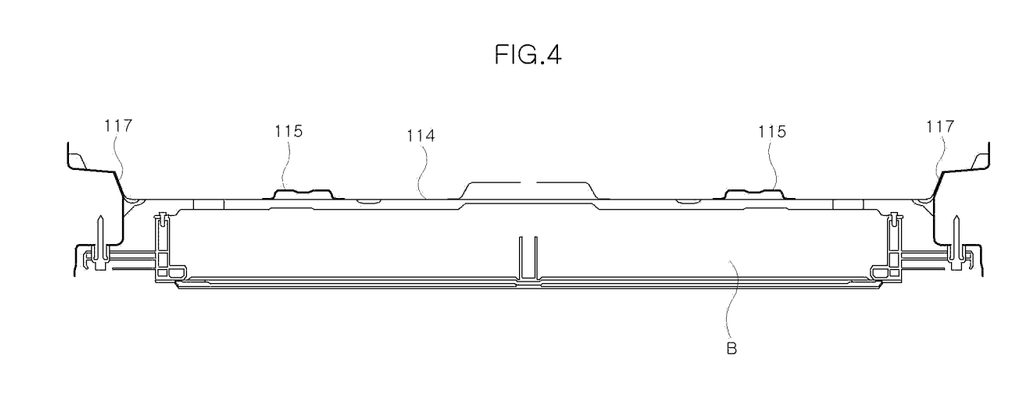
FIG. 4 is a cross-sectional diagram illustrating a state where a high-voltage battery is mounted on the cross section taken along the line B-B illustrated in FIG. 3.
Figure 7:
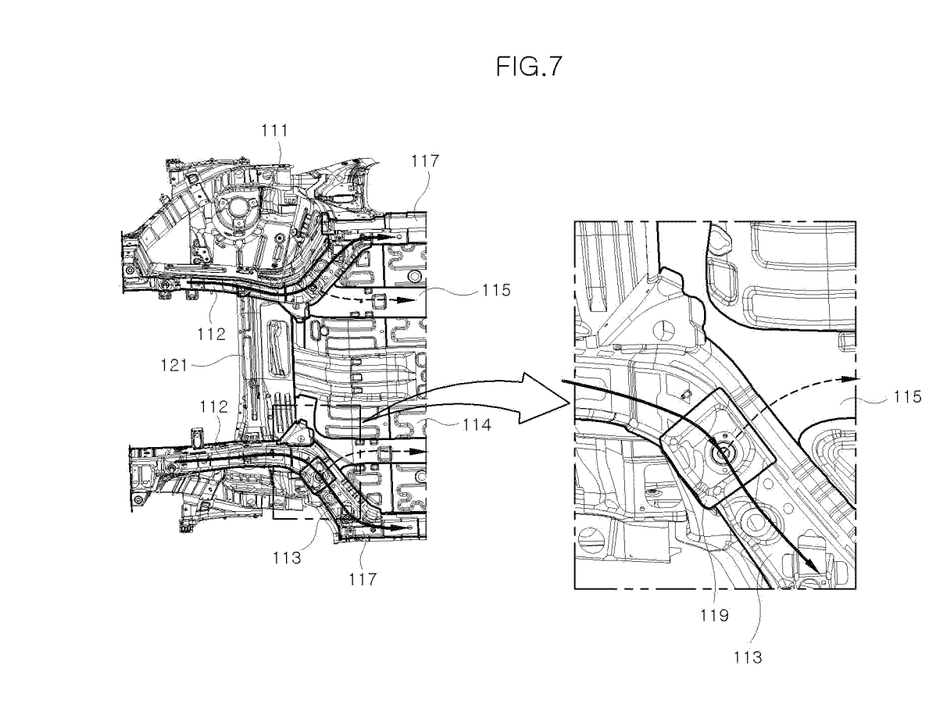
FIG. 7 is a bottom perspective diagram illustrating a load pass in the front lower body structure of the electric vehicle according to the related art.
Figure 8:
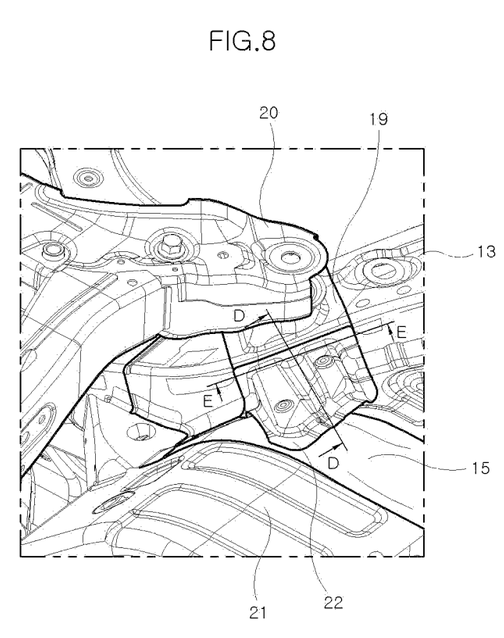
FIG. 8 is a bottom perspective diagram illustrating a portion in which a front sub-frame is mounted in a vehicle to which a front lower body structure of a vehicle having improved stiffness according to embodiments of the present disclosure is applied.

However, as illustrated in FIG. 4, an electric vehicle is mounted with a high-voltage battery B in a space between the minimum ground clearance and the center floor panel 114 to secure the space in which the high-voltage battery B is mounted as much as possible. According to such a structure, since the electric vehicle is not formed with the center floor side member 116, the load input to the front side member 112 is mostly transferred to the side sill inner 117 through a front side rear lower member 113 (see FIG. 3). It is difficult to secure sufficient stiffness because of the simplified load transfer path. A center floor side upper member 115 exists on the upper surface of the center floor panel 114, but the load transferred therethrough has an insignificant level compared to the load transfer through the center floor side member 116 (see the dotted arrow illustrated in FIG. 7), and is substantially transferred to the side sill inner 117 through the front side rear lower member 113.

As described above, as the load pass is simplified and load concentrates on the side sill inner 117, the collision performance and the durability performance is lowered, and noise, vibration, harshness (NVH) is also disadvantageous.

Figure 5:
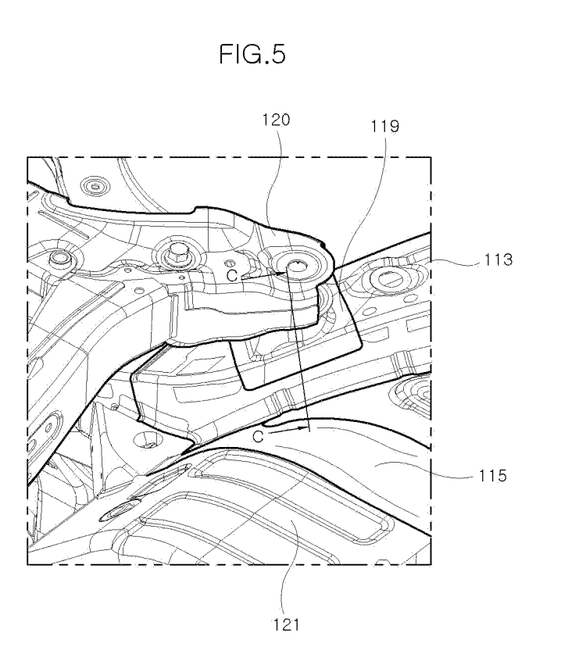
FIG. 5 is a bottom perspective diagram illustrating a portion in which a front sub-frame is mounted in the electric vehicle according to the related art.
Figure 6:
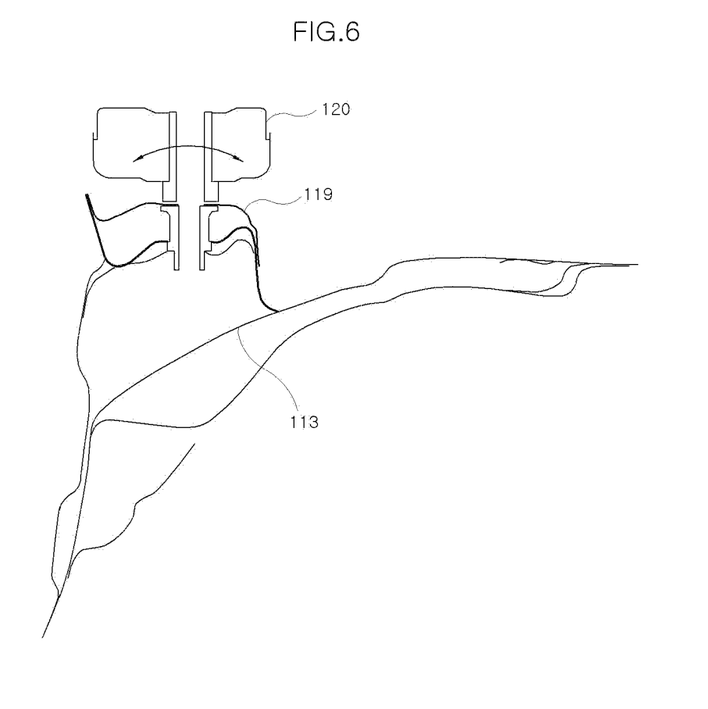
FIG. 6 is a cross-sectional diagram taken along the line C-C illustrated in FIG. 5.

A front sub-frame 120 of the vehicle has the rear end fastened to the front side member 112 side through a front sub-frame rear mounting bracket 119. That is, as illustrated in FIG. 5, the front sub-frame rear mounting bracket 119 is bonded to the front side rear lower member 113 formed on the rear of the front side member 112 by welding, and then the front sub-frame 120 is fastened to the front sub-frame rear mounting bracket 119. However, the front sub-frame rear mounting bracket 119 may be located on the load pass through which the load concentrates and is transferred, thereby sufficiently securing the stiffness in the longitudinal direction of the front side rear lower member 113, but it is difficult to secure sufficient stiffness in the normal direction of the front side rear lower member 113, and the movement is large in the normal direction (see FIG. 6), thereby being inevitably disadvantageous even for the NVH performance.

Further, the electric vehicle being recently developed does not adopt the center tunnel 118 either such that a sliding structure is applied to a console as well as a seat in order to provide the movement convenience of the passenger within the vehicle and to provide the cozy environment upon resting within the vehicle. However, this is disadvantageous for securing the stiffness in the front and rear direction.

The contents described in this section are to help the understanding of the background of the present disclosure, and may include what is not previously known to those skilled in the art to which the present disclosure pertains.

SUMMARY

The present disclosure relates to a front lower body structure of a vehicle having improved stiffness. Particular embodiments relate to a front lower body structure of a vehicle having improved stiffness, which improves the stiffness of the vehicle in the front and rear direction in a vehicle having a flat center floor panel like an electric vehicle, thereby improving collision performance, durability performance, and NVH performance.

The present disclosure may solve problems in the related art, and an embodiment of the present disclosure provides a front lower body structure of a vehicle having improved stiffness, which distributes the load input to the front of the vehicle to a dash panel and a center floor side through a center floor side upper member without concentrating on a side sill side, thereby improving collision performance, durability performance, and NVH performance.

A front lower body structure of a vehicle having improved stiffness according to an embodiment of the present disclosure includes a front side rear lower member connected from a front side member formed on one side of a fender apron to a side sill inner, a center floor side upper member formed in the longitudinal direction of the vehicle to extend from the upper surface of a dash panel to a center floor panel, and a reinforcement bracket connecting the front side rear lower member with the center floor side upper member.

A reinforcement groove is formed in a direction in which the front side rear lower member and the center floor side upper member are connected to the reinforcement bracket.

One end of the reinforcement bracket is bonded to a front sub-frame rear mounting bracket having a front sub-frame fastened to the front side rear lower member, and the other end of the reinforcement bracket is bonded to the center floor side upper member.

The reinforcement bracket includes a main body part, a reinforcement groove formed to be stepped with the main body part, and a flange part formed along the circumference of the main body part.

The flange part includes a first flange part formed on one side of the main body part and bonded to the front side rear lower member, a second flange part bonded to the center floor side upper member, and a third flange part connecting the first flange part with the second flange part along the circumference of the main body part.

The reinforcement groove is formed to be stepped with the main body part to be directed to the inside of the reinforcement bracket from the main body.

The first flange part is welded to at least one of the front side rear lower member and the front sub-frame rear mounting bracket.

The second flange part is welded with the dash panel and the center floor side upper member by three layers.

The front lower body structure of the vehicle having improved stiffness according to embodiments of the present disclosure having the above configuration sufficiently distributes and transfers the load input to the front side member from the dash panel to the center floor side upper member formed on the center floor panel through the reinforcement bracket from the front side rear lower member without concentrating on the side sill inner.

As described above, the load is also distributed and transferred toward the center floor side upper member without concentrating on the side sill inner, thereby improving the stiffness to improve collision performance, durability performance, and NVH performance.

DETAILED DESCRIPTION OF ILLUSTRATIVE EMBODIMENTS

Hereinafter, a front lower body structure of a vehicle having improved stiffness according to embodiments of the present disclosure will be described in detail with reference to the accompanying drawings.

As illustrated in FIGS. 8-13, a front lower body structure of a vehicle having improved stiffness according to embodiments of the present disclosure includes a front side rear lower member 13 connected from a front side member 12 formed on one side of a fender apron 11 to a side sill inner 17, a center floor side upper member 15 formed in the longitudinal direction of the vehicle to extend from the upper surface of a dash panel 21 to a center floor panel 14, and a reinforcement bracket 22 connecting the front side rear lower member 13 with the center floor side upper member 15.

The front lower body structure of the vehicle according to embodiments of the present disclosure is preferably for an electric vehicle in which a center panel 18 is not formed on the center floor panel 14.

The front side member 12 is formed on one side of the fender apron 11 in the longitudinal direction of the vehicle.

The front side rear lower member 13 formed on the rear of the front side member 12 is connected to the side sill side of the vehicle, that is, the side sill inner 17. Since the front side member 12 is located inside the fender apron 11 and the side sill inner 17 is located on the side end of the vehicle, the front side rear lower member 13 is disposed to be tilted from the front inside of the vehicle toward the rear outside of the vehicle.

The center floor side upper member 15 is formed in the longitudinal direction of the vehicle to extend from the upper surface of the dash panel 21 to the center floor panel 14.

The reinforcement bracket 22 is provided such that the load transferred from the front side rear lower member 13 to the side sill inner 17 is distributed to the front side rear lower member 13. The reinforcement bracket 22 connects the front side rear lower member 13 with the center floor side upper member 15 to form the pass through which the load is transferred from the front side rear lower member 13 toward the center floor side upper member 15 as well as the side sill inner 17, thereby inducing the load distribution.

In the electric vehicle, to secure a space in which the high-voltage battery B (shown in FIG. 4) is to be mounted, the center floor side member (e.g., the center floor side member 116 of FIG. 1) is not formed from the dash panel 21 to the center floor panel 14, thereby not distributing the load from the front side rear lower member 13 through the center floor side member. Further, since the center tunnel (e.g., the center tunnel 118 of FIG. 1) is not formed, the strength in the front and rear direction is inevitably weak.

Therefore, the reinforcement bracket 22 is provided such that the load in the front and rear direction is transferred from the front side rear lower member 13 to the center floor side upper member 15 formed in the electric vehicle.

Figure 9:
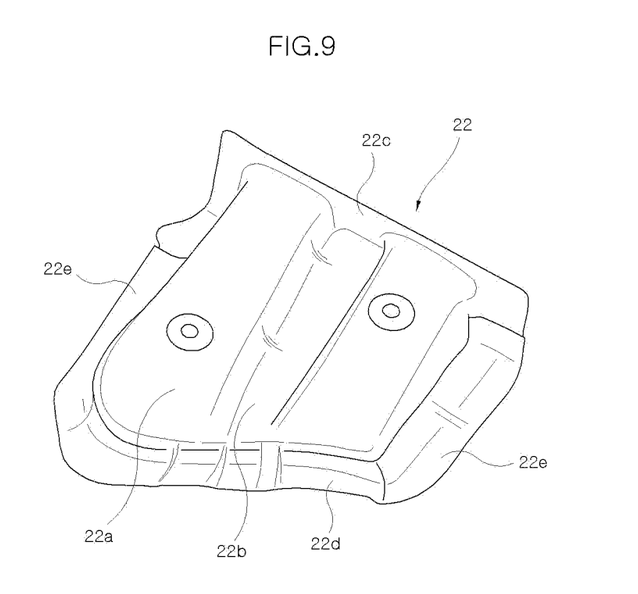
FIG. 9 is a bottom perspective diagram illustrating a reinforcement bracket in the front lower body structure of the vehicle having improved stiffness according to embodiments of the present disclosure.
Figure 10:
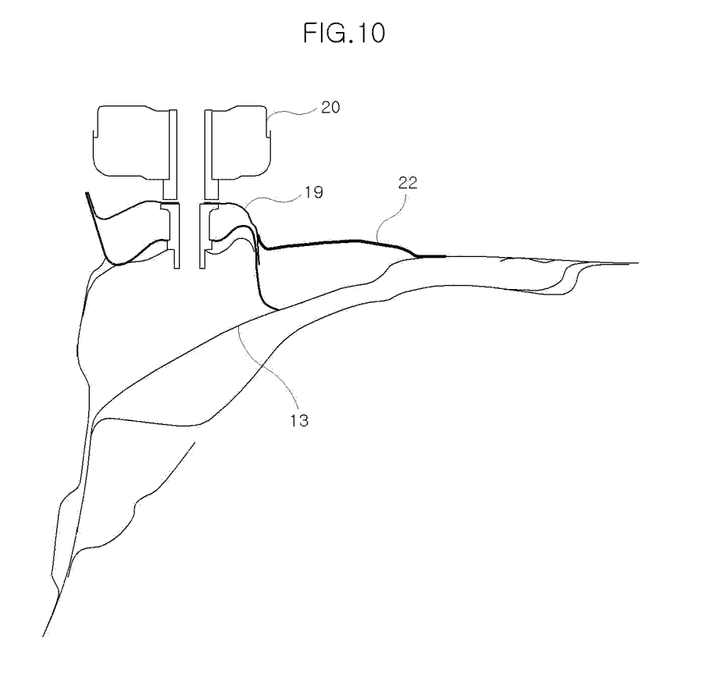
FIG. 10 is a cross-sectional diagram taken along the line D-D illustrated in FIG. 8.

As illustrated in FIG. 9, the reinforcement bracket 22 includes a main body part 22a, a reinforcement groove 22b formed to be stepped with the main body part 22a, and a flange part formed along the circumference of the main body part 22a. Here, the flange part includes a first flange part 22c formed on one side of the main body part 22a and bonded to the front side rear lower member 13, a second flange part 22d bonded to the center floor side upper member 15, and a third flange part 22e connecting the first flange part 22c with the second flange part 22d along the circumference of the main body part 22a.

The main body part 22a is formed of a metallic plate to form a load pass from the front side rear lower member 13 to the center floor side upper member 15.

The reinforcement groove 22b is formed to be stepped with the main body part 22a on the intermediate portion of the main body part 22a. The reinforcement groove 22b is formed to be directed to the inside of the vehicle from the front side member 12. The pass, through which the load is transferred in the direction in which the reinforcement groove 22b is formed, is formed.

Figure 11:
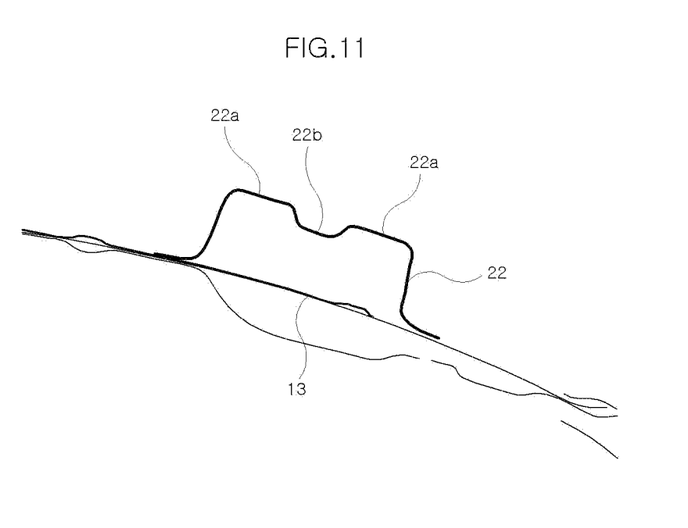
FIG. 11 is a cross-sectional diagram taken along the line E-E illustrated in FIG. 8.

At this time, the reinforcement groove 22b is formed to be stepped with the main body part 22a from the main body part 22a toward the inside of the reinforcement bracket 22, such that the shape of the cross section perpendicular to the load pass is formed to be bent (see FIG. 11). Therefore, the reinforcement bracket 22 may sufficiently support the load transferred from the front sub-frame rear mounting bracket 19 to the center floor side upper member 15.

The load input from the front end of the vehicle is transferred along the front side rear lower member 13 and then a part (see the solid arrow illustrated in FIG. 12) thereof is transferred from the front sub-frame rear mounting bracket 19 to the side sill inner 17, and the remainder (see the dotted arrow illustrated in FIG. 12) is transferred to the center floor side upper member 15 through the reinforcement bracket 22, such that the load is appropriately distributed without concentrating on the side sill inner 17.

Figure 12:
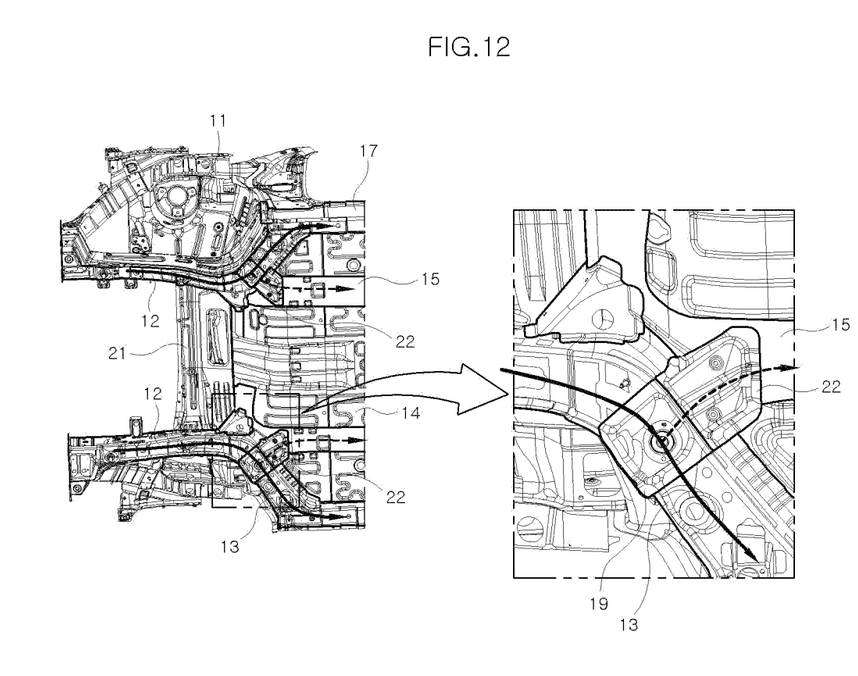
FIG. 12 is a bottom perspective diagram illustrating a load pass in the front lower body structure of the vehicle having improved stiffness according to embodiments of the present disclosure.

As illustrated in FIG. 12, the load transferred from the front end of the vehicle to the front side rear lower member 13 is distributed from the front sub-frame rear mounting bracket 19 to the side sill inner 17 and the center floor side upper member 15 (the load transferred to the side sill inner 17 is illustrated as the solid line, and the load transferred to the center floor side upper member 15 is illustrated as the dotted line). As described above, the load may be distributed and transferred without concentrating on the specific pass, thereby increasing the stiffness of the vehicle lower structure through the reinforcement bracket 22.

Figure 13:
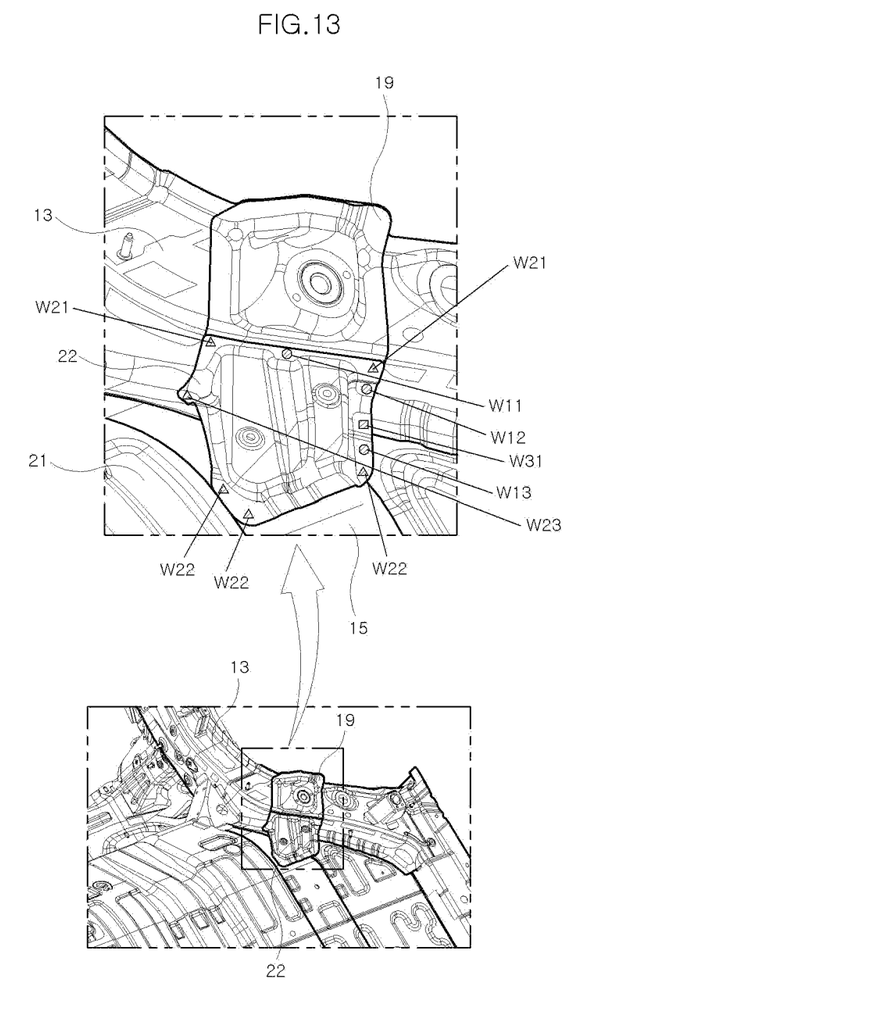
FIG. 13 is a bottom perspective diagram illustrating a portion in which the reinforcement bracket is welded in the front lower body structure of the vehicle having improved stiffness according to embodiments of the present disclosure.

FIG. 13 illustrates the relationship in which the reinforcement bracket 22 is bonded to another adjacent member by welding. The reinforcement bracket 22 is bonded to another adjacent member by welding in a state of being bonded thereto.

A first welding part W11 has the first flange part 22c welded with the front sub-frame rear mounting bracket 19 in the intermediate portion of the first flange part 22c by plug welding.

A second welding part W12 has the front side rear lower member 13 and the reinforcement bracket 22 welded. The second welding part W12 is located on the first flange part 22c. At this time, the second welding part W12 is located higher than a fourth welding part W21. That is, FIG. 13 illustrates the bottom surface of the above configuration, and illustrates that the second welding part W12 is located lower than the fourth welding part W21 but in the real vehicle, the second welding part W12 is located higher than the fourth welding part W21.

A third welding part W13 has the reinforcement bracket 22 and the dash panel 21 welded. The third welding part W13 may be located on a portion located on the rear of the vehicle from the main body part 22a in the second flange part 22d.

The fourth welding part W21 has the reinforcement bracket 22 welded with the front sub-frame rear mounting bracket 19 and the front side rear lower member 13. The reinforcement bracket 22 may be welded with the front sub-frame rear mounting bracket 19 and the front side rear lower member 13 on both ends of the first flange part 22c in the front and rear direction of the vehicle.

A fifth welding part W22 has the reinforcement bracket 22 welded with the center floor side upper member 15 and the dash panel 21. The second flange part 22d is welded with the center floor side upper member 15 and the dash panel 21 on the side of the reinforcement bracket 22, which is located inside the vehicle. At this time, the fifth welding part W22 is preferably welded to be formed on a plurality of points to enhance the bonding force.

A sixth welding part W23 has the reinforcement bracket 22 bonded with the front side rear lower member 13 and the dash panel 21. The second flange part 22d located on the front side of the vehicle from the main body part 22a is welded with the front side member 12 and the dash panel 21 to form the sixth welding part W23.

A seventh welding part W31 has the reinforcement bracket 22 welded with the front side rear lower member 13, the center floor side upper member 15, and the dash panel 21. The seventh welding part W31 may be located on the portion in which the first flange part 22c and the second flange part 22d are connected in the reinforcement bracket 22. Particularly, the seventh welding part W31 may be located on the portion in which the first flange part 22c and the second flange part 22d are connected to the main body part 22a on the rear of the vehicle.

Meanwhile, the first welding part W11 is welded by plug welding, and the second welding part W12 to seventh welding part W31 are welded by spot welding.

What is claimed is:

1. A front lower body structure of a vehicle comprising:
   a front side rear lower member connected from a front side member disposed on one side of a fender apron to a side sill inner;
   a center floor side upper member disposed in a longitudinal direction of the vehicle and extending from an upper surface of a dash panel to a center floor panel;
   a reinforcement bracket connecting the front side rear lower member with the center floor side upper member; and
   a reinforcement groove disposed in a direction in which the front side rear lower member and the center floor side upper member are connected to the reinforcement bracket.

2. The structure of claim 1, wherein:
   a first end of the reinforcement bracket is bonded to a front sub-frame rear mounting bracket having a front sub-frame fastened to the front side rear lower member; and
   a second end of the reinforcement bracket is bonded to the center floor side upper member.

3. The structure of claim 1, wherein the reinforcement bracket comprises:
   a main body part, wherein the reinforcement groove is formed to be stepped with the main body part; and
   a flange part formed along a circumference of the main body part.

4. The structure of claim 3, wherein the flange part comprises:
   a first flange part formed on one side of the main body part and bonded to the front side rear lower member;
   a second flange part bonded to the center floor side upper member; and
   a third flange part connecting the first flange part with the second flange part along the circumference of the main body part.

5. The structure of claim 4, wherein the first flange part is welded to at least one of the front side rear lower member or a front sub-frame rear mounting bracket.

6. The structure of claim 4, wherein the second flange part is welded with the dash panel and the center floor side upper member by three layers.

7. The structure of claim 3, wherein the reinforcement groove is formed to be stepped with the main body part to be directed to an inside of the reinforcement bracket from the main body part.

8. A vehicle comprising:
a front side rear lower member connected from a front side member disposed on one side of a fender apron to a side sill inner;
a center floor side upper member disposed in a longitudinal direction of the vehicle and extending from an upper surface of a dash panel to a center floor panel; and
a reinforcement bracket connecting the front side rear lower member with the center floor side upper member, the reinforcement bracket comprising:
a main body part comprising a metallic plate;
a reinforcement groove formed to be stepped with the main body part; and
a flange part formed along a circumference of the main body part.

9. The vehicle of claim 8, wherein the reinforcement groove is disposed in a direction in which the front side rear lower member and the center floor side upper member are connected to the reinforcement bracket.

10. The vehicle of claim 8, wherein:
a first end of the reinforcement bracket is bonded to a front sub-frame rear mounting bracket having a front sub-frame fastened to the front side rear lower member; and
a second end of the reinforcement bracket is bonded to the center floor side upper member.

11. The vehicle of claim 8, wherein the flange part comprises:
a first flange part formed on one side of the main body part and bonded to the front side rear lower member;
a second flange part bonded to the center floor side upper member; and
a third flange part connecting the first flange part with the second flange part along the circumference of the main body part.

12. The vehicle of claim 11, wherein the first flange part is welded to at least one of the front side rear lower member or a front sub-frame rear mounting bracket.

13. The vehicle of claim 11, wherein the second flange part is welded with the dash panel and the center floor side upper member by three layers.

14. The vehicle of claim 8, wherein the reinforcement groove is formed to be stepped with the main body part to be directed to an inside of the reinforcement bracket from the main body part.

15. A method of forming a front lower body structure of a vehicle, the method comprising:
connecting a front side rear lower member from a front side member disposed on one side of a fender apron to a side sill inner;
positioning a center floor side upper member in a longitudinal direction of the vehicle and extending from an upper surface of a dash panel to a center floor panel;
connecting the front side rear lower member with the center floor side upper member with a reinforcement bracket;
bonding a first end of the reinforcement bracket to a front sub-frame rear mounting bracket having a front sub-frame fastened to the front side rear lower member; and
bonding a second end of the reinforcement bracket to the center floor side upper member.

16. The method of claim 15, wherein the reinforcement bracket comprises:
a main body part;
a reinforcement groove formed to be stepped with the main body part; and
a flange part formed along a circumference of the main body part, wherein the flange part comprises:
a first flange part formed on one side of the main body part and bonded to the front side rear lower member;
a second flange part bonded to the center floor side upper member; and
a third flange part connecting the first flange part with the second flange part along the circumference of the main body part.

17. The method of claim 16, further comprising:
welding the first flange part to at least one of the front side rear lower member or the front sub-frame rear mounting bracket; and
welding the second flange part with the dash panel and the center floor side upper member by three layers.

18. The method of claim 16, wherein the reinforcement groove is formed to be stepped with the main body part to be directed to an inside of the reinforcement bracket from the main body part.

19. The structure of claim 3, wherein:
a first end of the reinforcement bracket is bonded to a front sub-frame rear mounting bracket having a front sub-frame fastened to the front side rear lower member; and
a second end of the reinforcement bracket is bonded to the center floor side upper member.

20. The vehicle of claim 11, wherein the reinforcement groove is disposed in a direction in which the front side rear lower member and the center floor side upper member are connected to the reinforcement bracket.

* * * * *